US006579351B2

United States Patent
Fisk et al.

(10) Patent No.: US 6,579,351 B2
(45) Date of Patent: Jun. 17, 2003

(54) INTEGRATED FILTER AND ADSORBENT UNIT FOR AN INTEGRATED RECEIVER-DRYER AND RELATED METHOD OF MANUFACTURING

(75) Inventors: John Dale Fisk, Edon, OH (US); Steven Lee Lambert, Washington, MI (US); Robert Daniel Bachman, Morenci, MI (US); Bill Wells, Hillsdale, MI (US)

(73) Assignee: Automotive Fluid Systems, Inc., Troy, MI (US)

( * ) Notice: Subject to any disclaimer, the term of this patent is extended or adjusted under 35 U.S.C. 154(b) by 0 days.

(21) Appl. No.: 09/977,149

(22) Filed: Oct. 12, 2001

(65) Prior Publication Data

US 2003/0070551 A1 Apr. 17, 2003

(51) Int. Cl.[7] ................................................ B01D 53/04
(52) U.S. Cl. ............................. 96/134; 55/318; 55/491; 55/514; 210/282; 210/DIG. 6
(58) Field of Search ........................ 55/315, 318, 490, 55/491, 495, 514, 515; 96/108, 134; 210/232, 282, 484, DIG. 6; 62/474, 503

(56) References Cited

U.S. PATENT DOCUMENTS

| | | | |
|---|---|---|---|
| 2,008,800 A | * | 7/1935 | Somers |
| 4,364,756 A | | 12/1982 | Clarke et al. |
| 4,401,447 A | | 8/1983 | Huber |
| 4,436,623 A | | 3/1984 | Cullen et al. |
| 4,737,174 A | * | 4/1988 | Pontius ........................ 55/491 |
| 4,756,166 A | | 7/1988 | Tomasov |
| 5,087,273 A | * | 2/1992 | Ward ............................ 239/55 |
| 5,245,842 A | | 9/1993 | Searfoss et al. |
| 5,435,153 A | | 7/1995 | Hutchinson et al. |
| 5,522,204 A | | 6/1996 | Wood |
| 5,557,945 A | * | 9/1996 | Mangyo et al. ........ 210/DIG. 6 |
| 5,580,451 A | | 12/1996 | Tack |
| 5,596,882 A | | 1/1997 | Hutchinson et al. |
| 5,695,535 A | * | 12/1997 | Hintenlang et al. ............ 55/379 |
| 5,718,743 A | | 2/1998 | Donnelly et al. |
| 5,865,998 A | | 2/1999 | Abraham et al. |
| 5,910,165 A | | 6/1999 | Haramoto et al. ............. 62/474 |
| 5,914,456 A | | 6/1999 | LeConey et al. .............. 96/121 |
| 5,966,810 A | | 10/1999 | Chisnell et al. ........... 29/890.06 |
| 5,996,371 A | | 12/1999 | Riemenschneider ......... 62/474 |
| 6,155,072 A | * | 12/2000 | Sullivan et al. ............... 62/474 |
| 6,170,288 B1 | | 1/2001 | Incorvia ...................... 62/509 |
| 6,178,772 B1 | | 1/2001 | Incorvia ...................... 62/509 |
| 6,214,095 B1 | * | 4/2001 | Logan et al. .............. 55/385.6 |

FOREIGN PATENT DOCUMENTS

WO    WO 0050825    8/2000

* cited by examiner

*Primary Examiner*—David A. Simmons
*Assistant Examiner*—Frank M. Lawrence
(74) *Attorney, Agent, or Firm*—VanOphem & VanOphem, P.C.

(57) ABSTRACT

An integrated filter body and adsorbent unit capable of being integrally fastened together for easy and economical assembly into a refrigerant pressure vessel assembly. The integrated filter and adsorbent unit includes a filter puck, an adsorbent unit mounted to the filter puck, and an integral feature on the filter puck for integrally fastening the adsorbent unit to the filter puck. The adsorbent unit includes a desiccant bag and a flap that has a mounting aperture and a fastening hole extending therethrough. The filter puck includes a disc-shaped body portion and a projection for cooperation with the fastening hole of the adsorbent unit. The projection is displaced to form an enlarged head for trapping the flap of the desiccant bag to the filter puck.

12 Claims, 3 Drawing Sheets

INTEGRATED FILTER AND ADSORBENT UNIT FOR AN INTEGRATED RECEIVER-DRYER AND RELATED METHOD OF MANUFACTURING

CROSS-REFERENCES TO RELATED APPLICATIONS

Not applicable.

FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention generally relates to pressure vessels for refrigeration systems. More specifically, this invention is directed to an apparatus, and a related method of manufacturing, for a receiver-dryer for a vehicle air-conditioning system, wherein the design is optimized to reduce manufacturing costs.

2. Description of the Related Art

In most vehicle air-conditioning systems, it is common to use one or the other of a receiver-dryer or an accumulator for various benefits. A receiver-dryer is typically located at the outlet end of a condenser in the pressure-side section of a refrigeration circuit. The receiver-dryer or accumulator is used for i) removing water from the refrigerant fluid, ii) screening out particulate matter, and iii) acting as a reservoir for the refrigerant fluid when refrigeration system demand is low.

A typical receiver-dryer includes a canister having an inlet port and a centrally positioned outlet port. An inlet tube extends through the inlet port and communicates with an upper interior portion of the canister, while an outlet tube extends through the outlet port and communicates with a lower interior portion of the canister. Desiccant and filter devices of various shapes, sizes, and structures have been fastened within the typical canister to screen and dry refrigerant passing between the inlet tube and outlet tube. Until now, however, such devices have been unnecessarily costly, difficult to assemble, and in some cases inefficient in operation. Therefore, efforts to improve the manufacturability of such devices continue.

For example, U.S. Pat. No. 5,865,998 to Abraham et al. teaches an improved desiccant bag that can be mounted with a receiver-dryer body without the use of any mounting plates. Abraham et al. disclose the receiver-dryer having an outlet tube with a retaining shoulder located thereon. Further, the desiccant bag includes a shell having a disc-shaped filter lid with a mounting hole formed therein and a rigid eyelet surrounding the mounting hole. The desiccant bag mounts over the outlet tube wherein the tube extends through the mounting hole and the rigid eyelet locates against the retaining shoulder to support the eyelet and limit movement of the desiccant bag within the receiver-dryer body. Unfortunately, however, the Abraham et al. desiccant bag is a very specialized design and is not as widely available as existing desiccant bag designs.

Another example is disclosed in U.S. Pat. No. 6,178,772 to Incorvia, which teaches an improved combined filter and adsorbent unit for a refrigerant receiver. Incorvia discloses that the filter unit consists of a disc-shaped filter portion extending radially outwardly from one end of an elongated tubular portion, wherein the filter portion either can be staked to the elongated tubular portion or can be integral therewith. The filter portion includes a circumferential seal therearound for sealing with an interior wall of the refrigerant receiver. An adsorbent container includes opposed bag portions and a yoke therebetween that is mounted to the elongated tubular portion such that the elongated tubular portion extends through a central aperture of the yoke. A rim circumscribes or defines the aperture, and is fused circumferentially to the elongated tubular portion. The elongated tubular portion mounts to the outlet tube such that the outlet tube extends through the elongated tubular portion. Alternatively, Incorvia discloses that the adsorbent container can be positioned separately and independently within the refrigerant receiver.

A disadvantage with the Incorvia reference is that it does not disclose details regarding how the adsorbent unit is fused to the filter unit. Another disadvantage is that fusing the adsorbent unit to an elongated tubular portion of the filter unit is likely an unnecessarily complex method of connection. Finally, the disclosure of Incorvia that the adsorbent unit need not be secured within the receiver-dryer, but rather may be freely located therein, is contrary to the goal of integrating and thus simplifying the design and reducing the manufacturing costs of receiver-dryers.

From the above, it can be appreciated that receiver-dryers of the prior art are not yet fully optimized to improve the design and reduce the manufacturing costs thereof. Therefore, what is needed is an improved receiver-dryer that incorporates simple design features and methods of integrating a filter and adsorbent unit for a receiver-dryer at a low cost.

BRIEF SUMMARY OF THE INVENTION

According to the preferred embodiment of the present invention, there is provided an integrated filter and adsorbent unit for use in an integrated receiver-dryer of the present invention. The integrated filter and adsorbent unit includes a filter puck, an adsorbent unit mounted to the filter puck, and an integral feature on the filter puck for integrally fastening the adsorbent unit to the filter puck. The filter puck is adapted for use with the adsorbent unit and preferably includes a disc-shaped body portion, and at least one projection extending therefrom for cooperation with a portion of the adsorbent unit. Likewise, the adsorbent unit is adapted for use with the filter and preferably includes a desiccant bag and a flap extending from the desiccant bag. The flap has a mounting aperture extending therethrough and also has a fastening hole extending therethrough.

In another aspect of the present invention a pressure vessel is adapted for use with a refrigeration system. The pressure vessel includes a housing, an outlet tube extending through the housing for directing a flow of refrigerant out of the housing, and an integrated filter and adsorbent unit that is mounted to the outlet tube. The integrated filter and adsorbent unit includes an adsorbent unit having a flap with a mounting aperture therethrough such that the outlet tube extends through the mounting aperture. A filter body likewise includes an aperture therethrough, wherein the outlet tube extends through the aperture. The filter body further includes a projection extending therefrom that has a displaced portion for retaining the flap of the adsorbent unit between the displaced portion and the filter body.

In a final aspect of the present invention, there is provided a method of manufacturing the integrated filter and adsorbent unit for use with a pressure vessel of a refrigeration system. The method includes the following steps. Manufacturing a filter body having a projection extending therefrom, producing an adsorbent unit having a flap extending therefrom, and assembling the adsorbent unit to the filter body by mounting the adsorbent unit to the filter body and then upsetting the projection over a portion of the flap to form a displaced portion of the projection for retaining the flap between the displaced portion and the filter body.

It is an object of the present invention to provide an improved integrated receiver-dryer for use in an air-conditioning system and to provide a related manufacturing method.

It is another object that an improved adsorbent unit and filter body subassembly is provided.

It is still another object that an integrated filter body and adsorbent unit is provided, such that separate fasteners or complicated fastening arrangements are avoided.

It is yet another object to provide an integrated filter body and adsorbent unit that is easily and inexpensively assembled and installed into a pressure vessel.

It is a further object of the present invention to use the integrated adsorbent unit and filter body to simplify the design and assembly of refrigerant pressure vessel assemblies to reduce manufacturing costs.

These objects and other features, aspects, and advantages of this invention will be more apparent after a reading of the following detailed description, appended claims, and accompanying drawings.

DETAILED DESCRIPTION OF THE PREFERRED EMBODIMENT

Figures 1, 2:
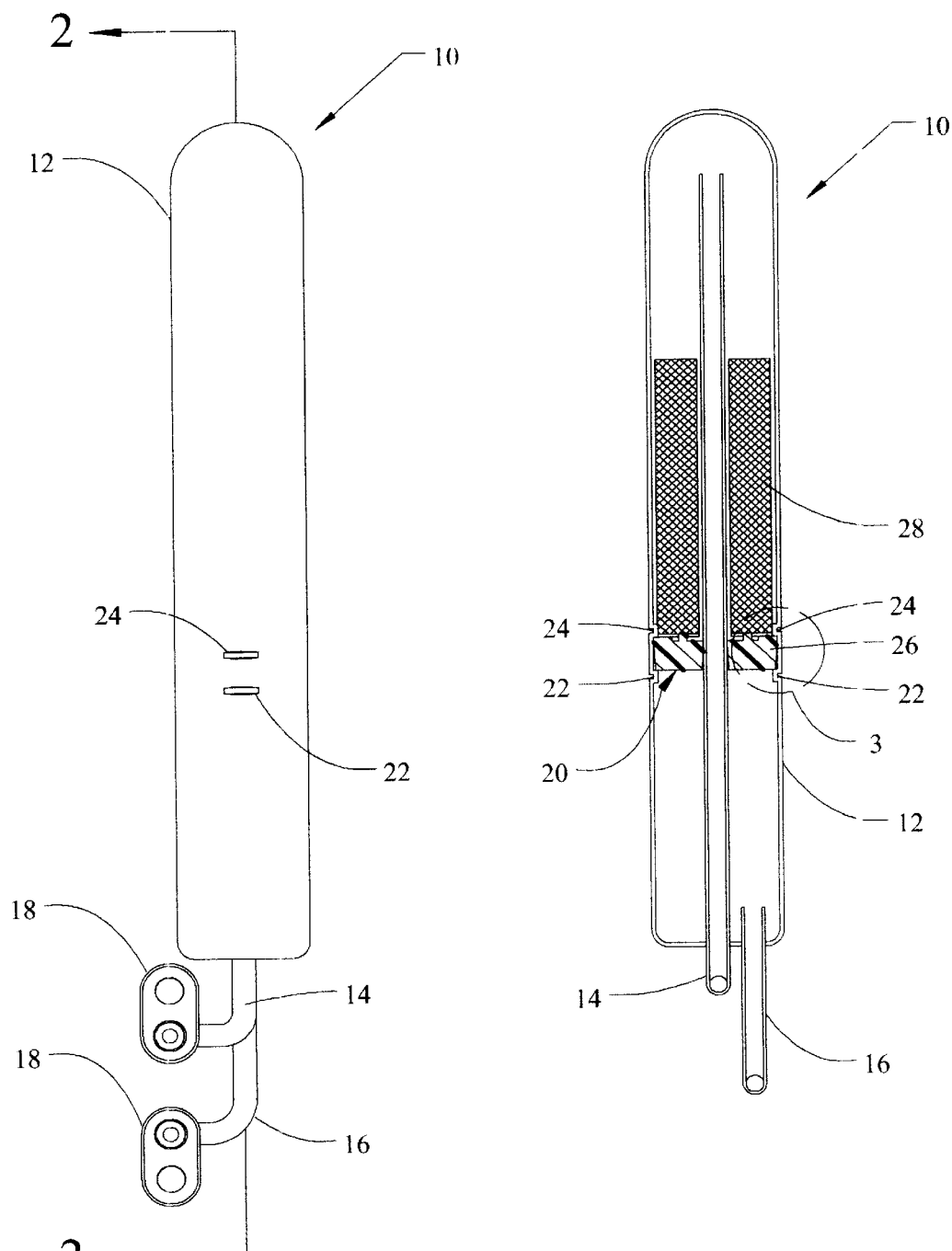
FIG. 1 is a side view of an integrated receiver-dryer unit according to the present invention.
FIG. 2 is a partial cross-sectional view of the integrated receiver unit along line 2—2 of FIG. 1, illustrating an integrated filter and adsorbent unit of the present invention.

In general, the present invention includes a pressure vessel or integrated receiver-dryer that is assembled in accordance with a method of the present invention. Receiver-dryers are typically one sub-system in a refrigeration circuit and are located at an outlet end of a condenser on the pressure-side section of the refrigeration circuit between the condenser and a thermal expansion valve. The receiver-dryer is used for i) removing water from the refrigerant fluid, ii) screening out particulate matter, and iii) acting as a reservoir for the refrigerant fluid when refrigeration system demand is low. Referring now in detail to the Figures, there is shown in FIG. 1 an integrated receiver-dryer 10 including a housing 12, an inlet tube 14, an outlet tube 16, and connecting blocks 18 for connecting to a heat exchanger (not shown), as is well known in the art.

As shown in FIG. 2, the housing 12 is preferably constructed of a thin walled metal such as a 6061T6 aluminum alloy. However, other suitable material could be used such as steel or plastic. The inlet tube 14 is fluidically connected to the condenser unit (not shown). Liquid and gaseous refrigerant fluid enters the housing 12 through the inlet tube 14 to be processed by the integrated receiver-dryer 10. The outlet tube 16 is fluidically connected to the thermal expansion valve (not shown) and conveys liquid refrigerant fluid thereto.

Figure 3:
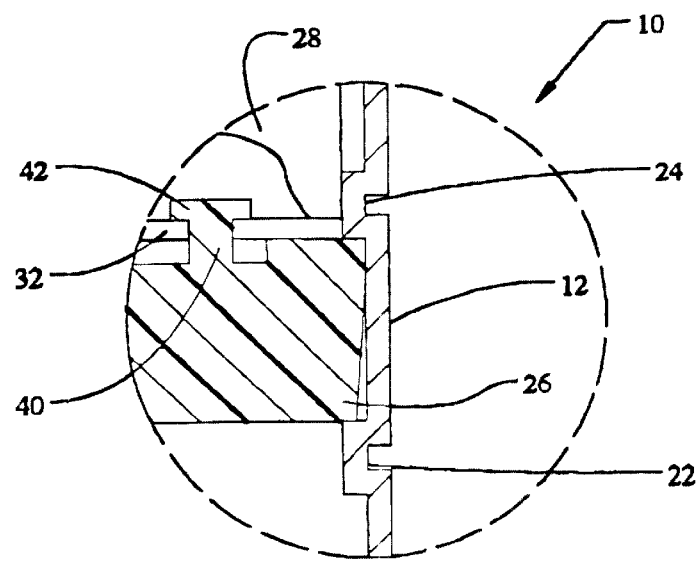
FIG. 3 is an enlarged sectional view of circle 3 of FIG. 2.

Still referring to FIG. 2, the integrated receiver-dryer 10 includes an integrated filter and adsorbent unit 20 that is mounted to the inlet tube 14 and is secured by lower and upper indentations 22 and 24 in the housing that are equidistantly spaced and formed in three places around the circumference of the housing 12. FIG. 3 more closely illustrates that a filter body or puck 26 of the integrated filter and adsorbent unit 20 is entrapped between the lower and upper indentations 22 and 24 to retain the integrated filter and adsorbent unit 20 within the housing 12. Alternatively, the integrated filter and adsorbent unit 20 could be press fit within the housing 12 or could be retained within the housing 12 in any other manner known in the art.

Figure 4:
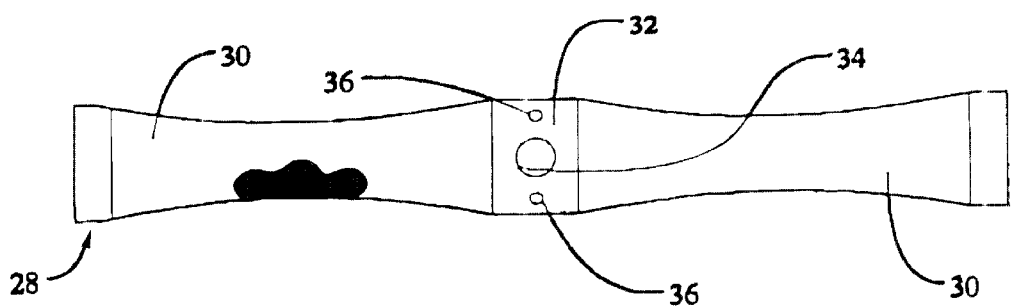
FIG. 4 is a top view of a saddle-type adsorbent unit of the present invention.

FIG. 4 illustrates a saddle-type adsorbent unit 28 of the present invention. In general, such adsorbent units 28 are well known in the art and include a pair of desiccant bags or casings 30 made of permeable material such as polyester. As is well known, a desiccant material such as silica pellets (not shown) for "drying" the refrigerant fluid is disposed within each casing 30. A flap, or yoke 32, is also made of the same permeable material and connects the pair of casings 30. The yoke 32 is relatively flat, does not contain any desiccant material, and includes a mounting aperture 34 therethrough. Such adsorbent units, their materials, and construction, are typically well known in the art. Uniquely, however, with the adsorbent unit 28 of the present invention, a pair of fastening holes 36 are disposed on either side of the mounting aperture 34.

Figure 5:
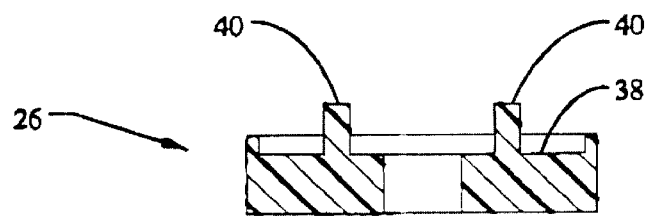
FIG. 5 is a cross-sectional view of a filter puck of the present invention.

FIG. 5 illustrates in cross section the round filter puck 26 of the present invention. Although not exactly the same, the filter puck 26 is similar to the cup assembly of U.S. Pat. No. 5,580,451, which is assigned to the assignee hereof and is incorporated by reference herein. The filter puck 26 here, however, is preferably partially injection molded from plastic material, and preferably includes one or more layers of filter media (not shown) embedded therein. Alternatively, the filter puck 26 can be assembled from several different components including a pervious housing, filter layers, and end covers (not shown). In other words, the general construction of the filter puck 26 is not critical to the novelty of the present invention. It is important, however, that the filter puck 26 have some filtering material or layer that is suitable for filtering out particulates within the refrigerant fluid yet allows refrigerant to pass therethrough without a detrimental pressure drop in the refrigerant circuit. Uniquely, the filter puck 26 includes a top surface 38 having nibs 40 or cylindrical projections extending therefrom. The nibs 40 are positioned and sized to cooperate with the fastening holes 36 of the adsorbent unit 28 of FIG. 4.

Figure 6:
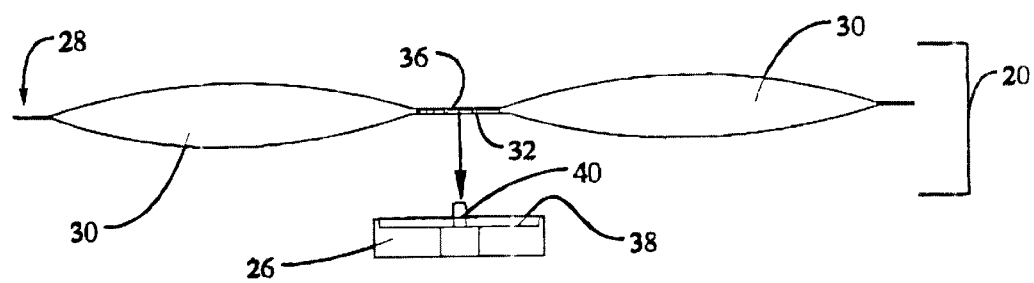
FIG. 6 is a side view of an unassembled version of the adsorbent unit and filter puck of the present invention.
Figure 7:
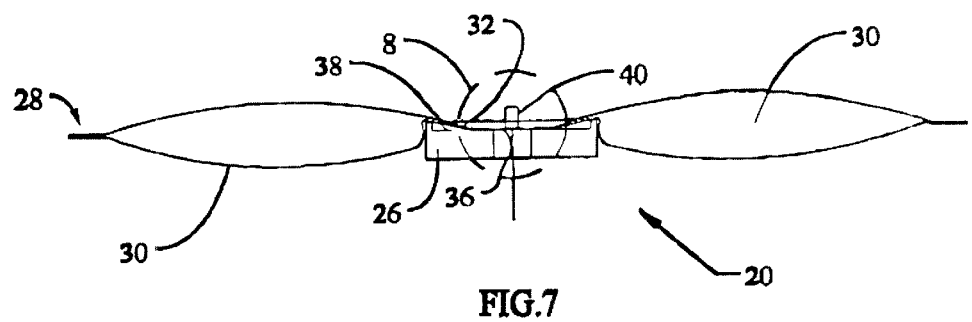
FIG. 7 is a side view of a partially assembled version of the adsorbent unit and filter puck of the present invention.
Figures 8, 8A:
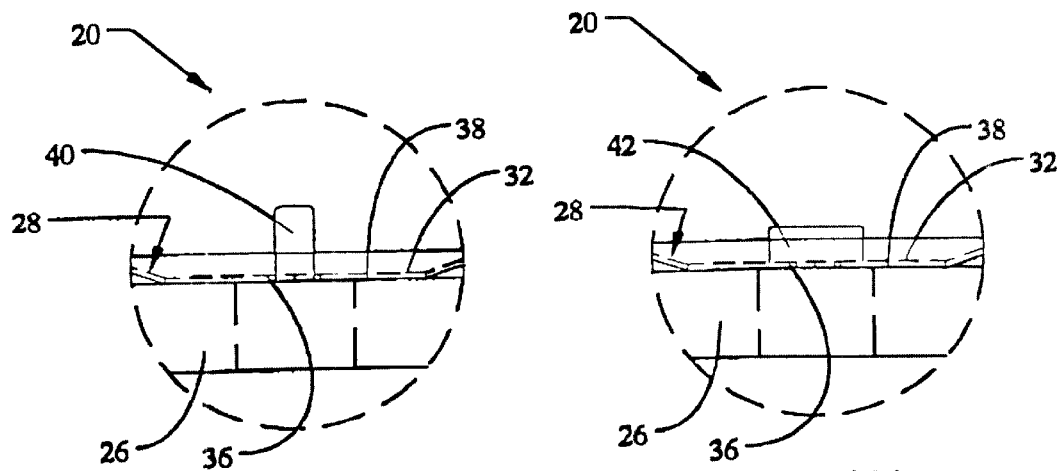
FIG. 8 is an enlarged sectional view of circle 8 of FIG. 7.
FIG. 8A is an enlarged sectional view of a fully assembled version of the integrated adsorbent unit and filter puck of the present invention.

Accordingly, FIGS. 6 through 8A illustrate the preferred method of assembling the integrated filter and adsorbent unit 20 of the present invention. First, as shown in FIG. 6, the fastening holes 36 in the yoke 32 of the adsorbent unit 28 are aligned over the nibs 40 of the filter puck 26. Next, the yoke 32 is mounted to the filter puck 26 such that the nibs 40 extend through the fastening holes 36, as shown in FIGS. 7 and 8. Finally, as shown in FIG. 8A, the nibs 40 are deformed or displaced so as to create enlarged head portions 42 having diameters greater than that of the respective fastening holes 36, so that the yoke 32 of the adsorbent unit 28 is entrapped between the enlarged head portions 42 and the top surface 38 of the filter puck 26. Accordingly, the adsorbent unit 28 is firmly and integrally retained to the filter puck 26. The nibs 40 are preferably deformed using well known ultrasonic upsetting techniques, but may also be performed by spin-forming, heat staking, crushing, or the like. It is contemplated that any type of cooperating geometry or features between the filter puck 26 and yoke 32 could be incorporated so long as some material of the filter puck 26 is displaced to integrally fasten the yoke 32 thereto, without the use of any separate fastening component.

In general with respect to all of the Figures, the integrated receiver-dryer 10 is preferably manufactured according to the following sequence of operations. First, the housing is either deep drawn from sheet-stock or spun closed from tube-stock to form a closed bottom end. The lower indentations are then formed in the side of the housing. At this point, the top end of the housing is still open to enable insertion of the integrated filter and adsorbent unit. As such, the integrated filter and adsorbent unit is then inserted into the open top end of the housing so that the filter puck is disposed below the adsorbent unit so that the outer diameter of the filter puck loosely fits within the inner diameter of the housing. Next, the filter and adsorbent unit is dropped down within the housing until the filter puck bottoms out on the lower indentations. Then, a top set of the indentations are formed to entrap the filter puck between both sets of lower and upper indentations. The housing is then spun closed as is well known in the art and as typified by U.S. Pat. No. 5,245,842, which is incorporated by reference herein. Holes are then produced in the closed bottom end to accommodate the inlet and outlet tubes. The inlet and outlet tubes are inserted into the respective holes such that the inlet tube extends through the mounting holes of the filter puck and adsorbent unit. Finally, the inlet and outlet tubes are welded or brazed to the housing.

While the present invention has been described in terms of a preferred embodiment, it is apparent that other forms could be adopted by one skilled in the art. In other words, the teachings of the present invention encompass any reasonable substitutions or equivalents of claim limitations. For example, the structure, materials, sizes, and shapes of the individual components could be modified or substituted with other similar structure, materials, sizes, and shapes. Specific examples include: substituting the illustrated adsorbent unit for one including only one casing with a flap extending therefrom; substituting the nibs of the filter puck for other integral features that can be displaced to interlock the yoke to the filter puck; or substituting the receiver-dryer for an accumulator. Those skilled in the art will appreciate that other applications, including those outside of the automotive industry, are possible with this invention. Accordingly, the present invention is not limited to only automotive refrigeration systems and the scope of the present invention is to be limited only by the following claims.

What is claimed is:

1. A filter adapted for use with an adsorbent unit in a pressure vessel of a refrigeration system, said filter comprising:

a disc-shaped body portion; and at least one projection extending therefrom, said at least one projection having a displaced portion adapted to retain said adsorbent unit.

2. An integrated filter and adsorbent unit comprising:

a filter puck having at least one projection integrally extending therefrom, said at least one projection having a displaced portion; and an adsorbent unit having a flap mounted to said at least one projection of said filter puck and retained by said displaced portion of said at least one projection.

3. An integrated filter and adsorbent unit comprising:

a filter body having at least one projection extending therefrom, said at least one projection having a displaced portion; and an adsorbent unit having a flap with at least one fastening hole therethrough, said fastening hole being larger in diameter than said at least one projection but smaller in diameter than said displaced portion, said flap being mounted to said filter body such that said at least one projection of said filter body extends through said at least one fastening hole, and thereafter said displaced portion of said at least one projection is formed to integrally retain said adsorbent unit to said filter body.

4. A pressure vessel adapted for use with a refrigeration system, said pressure vessel comprising:

a housing;

an inlet tube extending into said housing for directing a flow of refrigerant into said housing;

an outlet tube extending out of said housing for directing a flow of refrigerant out of said housing; and an integrated filter and adsorbent unit disposed within said housing, said integrated filter and adsorbent unit comprising:

at least one adsorbent unit having a flap, said flap having a mounting aperture therethrough, said inlet tube extending through said mounting aperture; and a filter body having an aperture therethrough, said inlet tube extending through said aperture, said filter body further having at least one projection extending therefrom, said at least one projection having a displaced portion retaining said flap of said adsorbent unit between said displaced portion and said filter body.

5. The pressure vessel as claimed in claim 4, wherein said flap of said adsorbent unit includes at least one fastening hole therethrough and said at least one projection of said filter body extends through said at least one fastening hole of said adsorbent unit prior to formation of said displaced portion, said displaced portion of said at least one projection being larger in diameter than said at least one fastening hole to retain said flap to said filter body.

6. The pressure vessel as claimed in claim 5, wherein said at least one projection of said filter body includes two opposed projections and said at least one fastening hole of said adsorbent unit includes two opposed fastening holes mounted to said two opposed projections.

7. The pressure vessel as claimed in claim 4, wherein said at least one adsorbent unit comprises a saddle-type design having two adsorbent units with a yoke portion therebetween serving as said flap, further wherein said housing comprises indentations formed therein for mounting said integrated filter and adsorbent unit to said housing.

8. A method of manufacturing an integrated filter and adsorbent unit for use with a pressure vessel of a refrigeration system, said method comprising the steps of:

provide manufacturing a filter body having at least one projection extending therefrom;

producing an adsorbent unit having a flap extending therefrom; and assembling said adsorbent unit to said filter body, said step of assembling said adsorbent unit to said filter body further comprising the steps of:

mounting said adsorbent unit to said filter body; and upsetting said at least one projection over at least a portion of said flap to form a displaced portion of said at least one projection that retains said flap between said displaced portion and said filter body.

9. The method as claimed in claim 8, wherein said assembling step further comprises the steps of:

providing said flap of said adsorbent unit with at least one fastening hole; and mounting said fastening hole of said flap over said at least one projection prior to said step of forming of said displaced portion.

10. The method as claimed in claim 8, wherein said upsetting step comprised ultrasonically forming said displaced portion of said at least one projection.

11. The method as claimed in claim 8, wherein said upsetting step comprised spin forming said displaced portion of said at least one projection.

12. The method as claimed in claim 8, wherein said upsetting step comprised crush forming said displaced portion of said at least one projection.

* * * * *

UNITED STATES PATENT AND TRADEMARK OFFICE
CERTIFICATE OF CORRECTION

PATENT NO. : 6,579,351 B2
DATED : June 17, 2003
INVENTOR(S) : Fisk et al.

It is certified that error appears in the above-identified patent and that said Letters Patent is hereby corrected as shown below:

<u>Column 8,</u>
Lines 12 and 15, kindly delete "comprised" and insert -- comprises --.

Signed and Sealed this

Sixth Day of July, 2004

JON W. DUDAS
*Acting Director of the United States Patent and Trademark Office*